United States Patent [19]
Cramaro et al.

[11] Patent Number: 5,240,304
[45] Date of Patent: Aug. 31, 1993

[54] TARPAULIN COVER SYSTEM

[75] Inventors: Nello Cramaro, Dundas, Canada; Michael C. Cramaro, Newark, Del.

[73] Assignee: Cramaro Tarpaulin Systems, Inc., New Castle, Del.

[21] Appl. No.: 963,124

[22] Filed: Oct. 19, 1992

[51] Int. Cl.⁵ .............................................. B60P 7/04
[52] U.S. Cl. .................................................. 296/100
[58] Field of Search .................. 296/100, 98, 105; 105/377

[56] References Cited

U.S. PATENT DOCUMENTS

| | | | |
|---|---|---|---|
| 4,014,590 | 3/1977 | Schulz, Jr. | 296/100 |
| 4,172,614 | 10/1979 | Quido, Jr. | 296/100 |
| 4,823,707 | 4/1989 | Salsbury et al. | 105/377 |
| 5,031,956 | 7/1991 | Hudgins | 296/100 |

Primary Examiner—Robert R. Song
Attorney, Agent, or Firm—Connolly & Hutz

[57] ABSTRACT

A tarpaulin cover system for covering and uncovering a vehicle body in accordance with a winding mechanism includes a plurality of spaced catch members secured on each of the sides of the two sides of the vehicle body. The tarpaulin extends partially down each side. A plurality of spaced lock members are provided on the sideward extensions of the tarpaulin corresponding to the number of catch members. Each lock member on the tarpaulin is disposed for being automatically engaged by a respective one of the catch members during the covering motion of the tarpaulin and automatically disengaged during the uncovering motion.

20 Claims, 3 Drawing Sheets

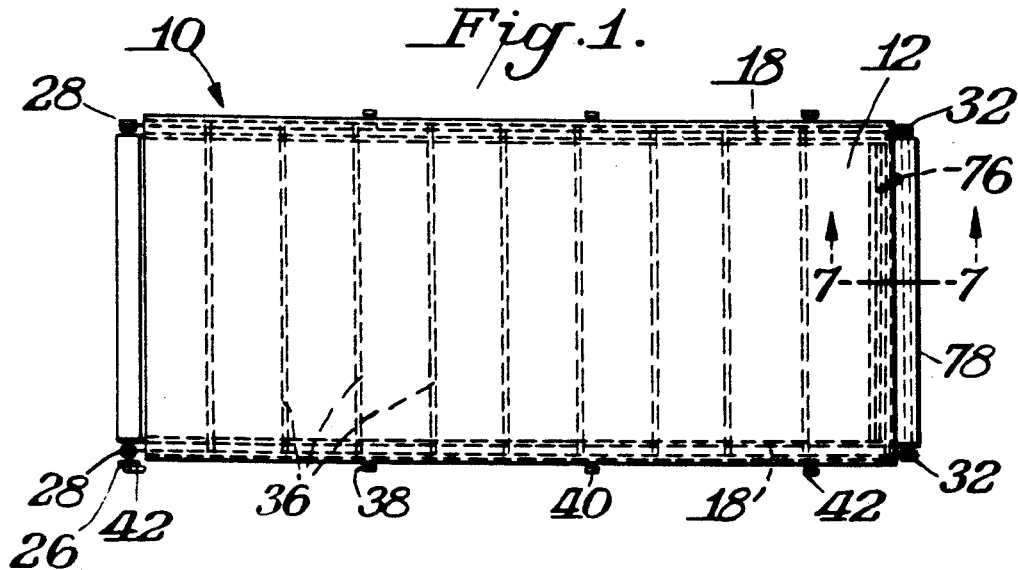
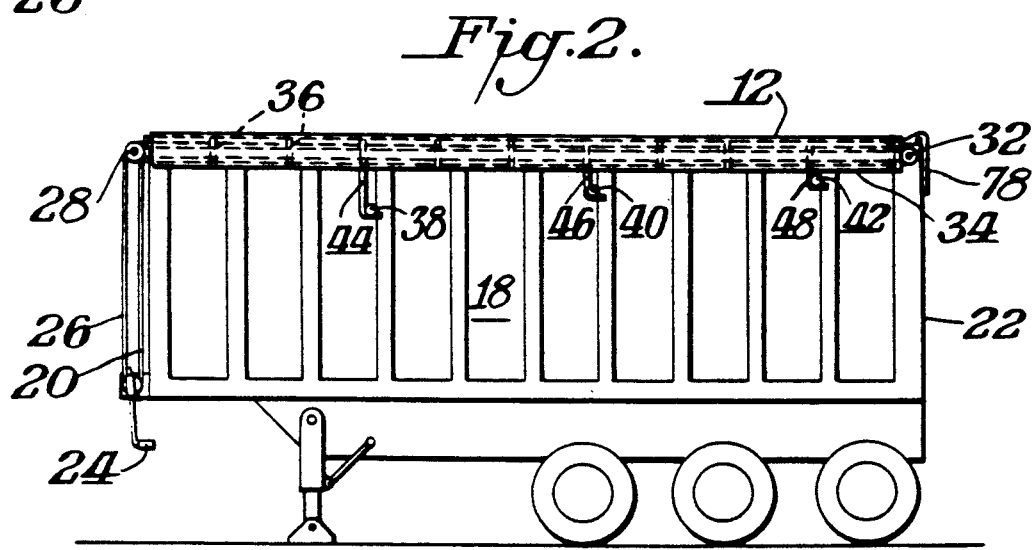
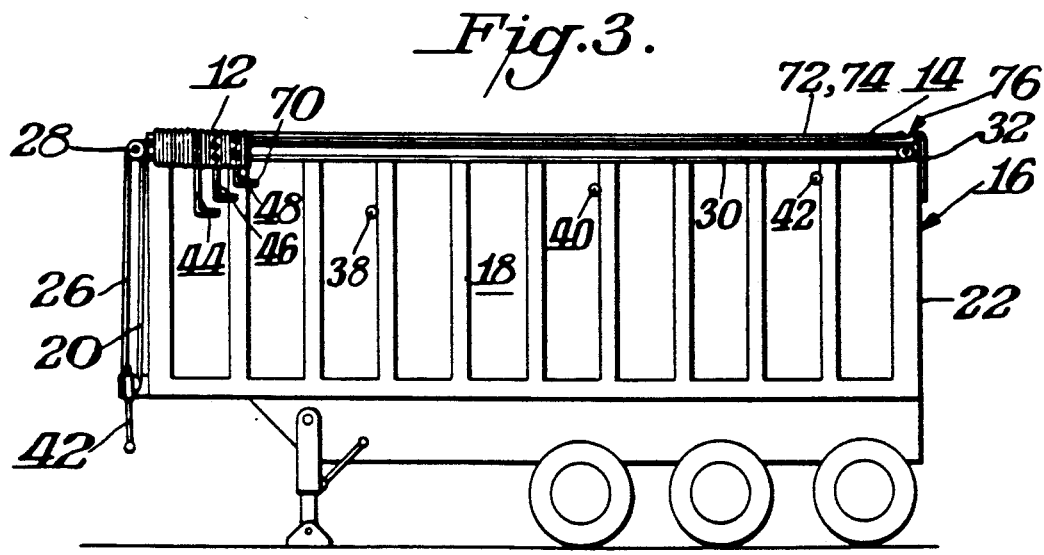

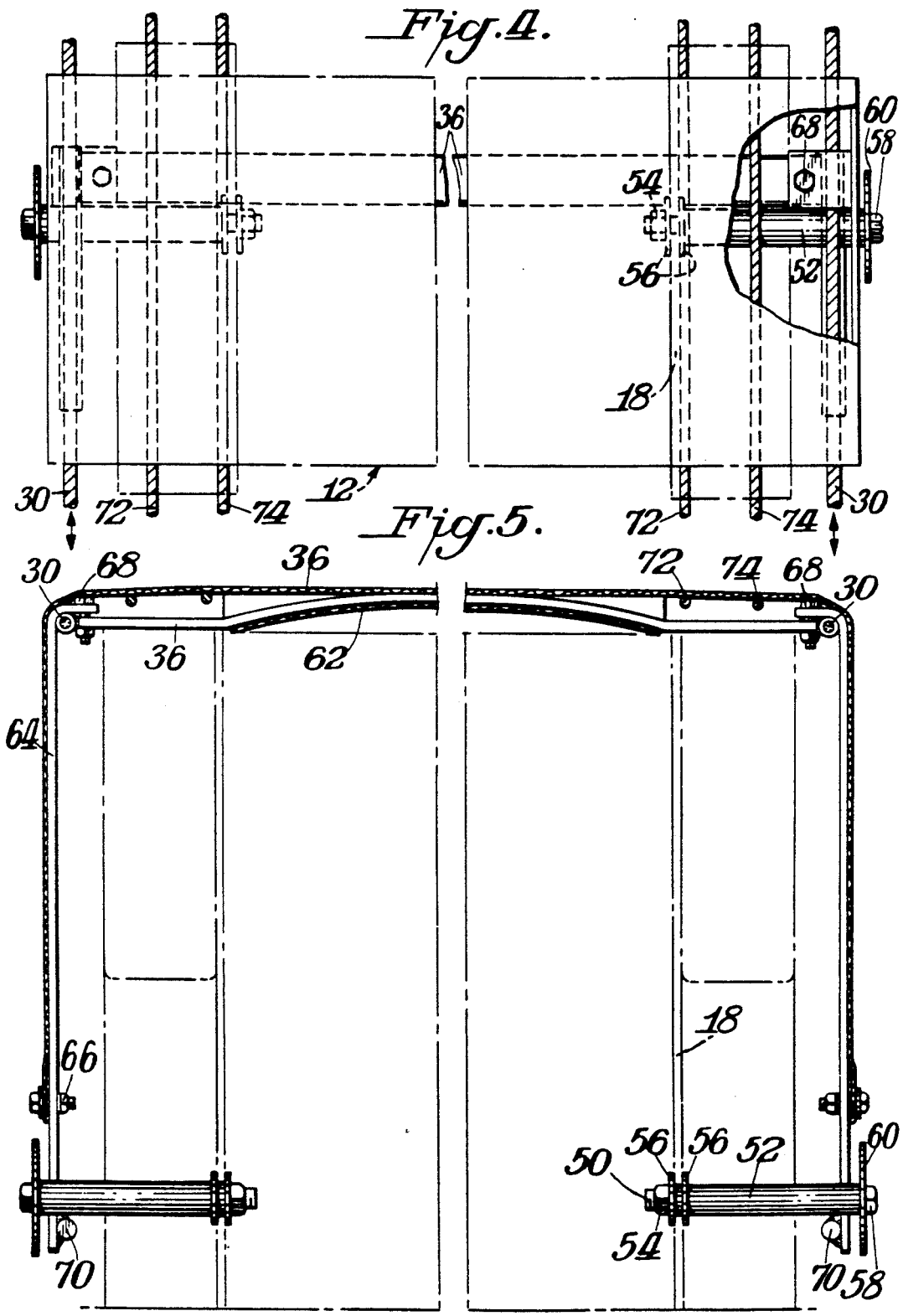

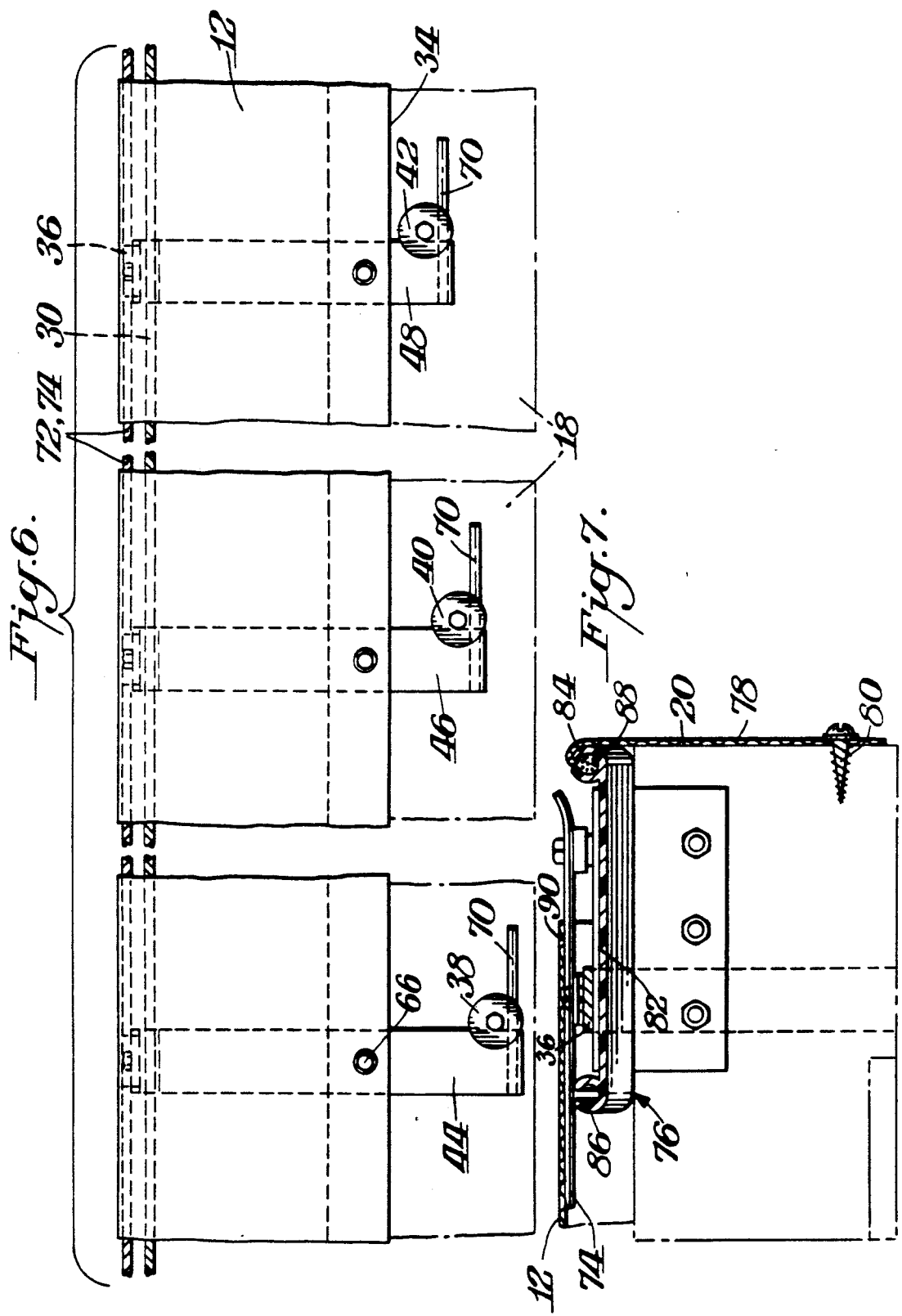

TARPAULIN COVER SYSTEM

BACKGROUND OF THE INVENTION

Tarpaulin cover systems are used for selectively covering and uncovering the open tops of vehicle bodies. When the tarpaulin is extended lengthwise over the open top the contents in the vehicle body are maintained within the body. Advantageously by retracting the tarpaulin the vehicle body is again exposed through its top. A particularly effective tarpaulin cover system is described in U.S. Pat. No. 4,189,178. The tarpaulin system therein includes a plurality of supporting rods or bows which extend across the vehicle body with the tarpaulin itself secured to the bows. A cranking mechanism at one end of the vehicle body can effectively cover or uncover the open top.

When such tarpaulin cover systems are used with vehicles, such as trucks, a lift is sometimes created from the wind which renders the fully extended tarpaulin in a condition so as to be not water tight. Various attempts have been made in the prior art to address such problems. The conventional approach is the use of ropes and straps over the tarpaulin extending from one side of the vehicle body to the other. There is also concern that certain loads should be maintained in a dry condition so that the tarpaulin should be as water tight as practical.

SUMMARY OF THE INVENTION

An object of this invention is to provide a tarpaulin cover system which meets the above needs.

A further object of this invention is to provide such a tarpaulin cover system which automatically locks the tarpaulin in place in a simple and effective manner.

In accordance with this invention the tarpaulin cover system includes a plurality of catch members secured at spaced longitudinal locations on each side of the vehicle body. The tarpaulin itself is wider than the vehicle body so that it has a downwardly extending section at each side. Each of the downwardly extending sections includes a plurality of lock members corresponding to the number of catch members. The lock members are disposed so that upon moving the tarpaulin in its covering direction each lock member is automatically engaged by a respective catch member. Conversely, when the tarpaulin is removed in its uncovering direction each lock member is automatically disengaged from its catch member.

In a preferred practice of this invention the catch members are posts which extend outwardly from the sides of the vehicle body. The posts are spaced from each other in a longitudinal direction and also staggered in a vertical direction. The lock members are preferably L-shaped extensions of selected bows used for mounting the tarpaulin. The lock members are also arranged in a staggered manner so that each lock member is associated with a corresponding catch member.

THE DRAWINGS

FIG. 1 is a top plan view of a tarpaulin cover system in accordance with this invention in its covered condition;

FIG. 2 is a side elevational view of the tarpaulin cover system shown in FIG. 1;

FIG. 3 is a side elevational view similar to FIG. 2 showing the tarpaulin system in its uncovered condition;

FIG. 4 is a top plan view partly in section of a portion of the tarpaulin system shown in FIGS. 1-3;

FIG. 5 is an end elevational view in section of the tarpaulin system shown in FIGS. 1-4;

FIG. 6 is a side elevational view partly in section of the tarpaulin system shown in FIGS. 1-5 in its covered condition; and FIG. 7 is a cross-sectional view taken through FIG. 1 along the line 7—7.

DETAILED DESCRIPTION

The present invention is directed to a tarpaulin cover system which automatically locks the tarpaulin to the vehicle body when the tarpaulin is moved to its covered condition and automatically disengages the locking action upon movement of the tarpaulin toward its uncovering condition. The invention may be used with any suitable tarpaulin system consistent with the features of this invention and is not intended to be limited to any particular manner of moving the tarpaulin in its covering and uncovering directions. A particularly suitable manner of practicing the invention, however, is with the type of mechanism shown in U.S. Pat. No. 4,189,178 to Nello Cramaro. That patent illustrates a crank mechanism using a series of cables and pulleys in connection with the bows to which the tarpaulin is attached for effecting the covering and uncovering movement. The details of U.S. Pat. No. 4,189,178 are incorporated herein by reference thereto.

In accordance with this invention the tarpaulin cover system 10 includes a tarpaulin 12 which is mounted over the open top 14 of a vehicle body 16. Vehicle body 16 also includes opposite sides 18,18 a front end 20 and a rear end 22. Such vehicle 16 is of any suitable known construction.

In the preferred practice of this invention a crank or handle 24 is secured at one end, such as the front end 20 of vehicle body 16. Crank 24 is connected by a drive belt 26 to a set of pulleys 28 which operate in connection with cables 30 and rear pulleys 32 to selectively cover and uncover the vehicle in accordance with the rotation of crank or handle 24.

As illustrated tarpaulin 12 is made of a width which is wider than the width of the open top 14 of vehicle body 16. Accordingly, tarpaulin 12 includes a downwardly extending section or apron 34 on each side of vehicle body 16. Section 34 may extend downwardly any suitable distance including substantially the entire extent of sides 18. In the preferred practice of the invention sections 34 extend only about fourteen inches below open top 14 to comply with regulations in various states in connection with the hauling of asphalt.

As illustrated in the various figures the tarpaulin is formed by being mounted to a plurality of spaced bows 36 which might be, for example, every thirty inches with respect to tarpaulin 12 when it is in its completely extended covering position.

In order to securely mount tarpaulin 12 against the sides 18 of vehicle body 16 an assembly of catch members and lock members is provided. Any suitable number of these members may be used in practicing the invention. In the illustrated embodiment three catch members 38, 40, 42 are mounted on each side 18 of vehicle body 16. A corresponding number of lock members 44, 46 and 48 are secured to each extension or apron 34 of tarpaulin 12.

FIGS. 4-6 illustrate the details of the catch members and lock members. As shown therein each catch member is in the form of a rod 50 mounted within a sleeve 52. Rod 50 includes a threaded end to which a nut 54 is secured. The threaded end is inserted through an appropriate hole in side wall 18 and is locked to side wall 18 by nut 54 pressing against washer 56 on one side of wall 18 with a second washer 56 disposed against the end of sleeve 52 to mount rod 50 in a rigid fixed horizontal position. The opposite end of rod 50 has a fixed head 58 with a disc 60 being trapped between head 58 and the end of sleeve 52.

FIGS. 5-6 best illustrate the details of the lock members. As shown therein the lock members are advantageously mounted to tarpaulin 12 by being secured to selected bows 36. For example, in the illustrated embodiment a lock member is provided for every third bow 36. A greater or lesser number of lock members may be provided without departing from the spirit of this invention.

As is known in the art bows 36 are secured to tarpaulin 12 in any suitable manner, such as by securing tarpaulin material 62 below bow 36 with the tarpaulin material 62 then stitched or otherwise secured to the main tarpaulin 12 so as to create a passageway for each respective bow. As shown in FIG. 5 each bow 36 is of arched construction with flat horizontal ends to prevent tarp slippage. It is to be understood that the invention may also be practiced where bows 36 are completely horizontal or completely arched or of any other orientation.

In accordance with this invention a flat bar 64 is secured to each end of the bows 36 to which the lock members are to be mounted. Bar 64 may be secured in any suitable manner including various fasteners 68 and/or by welding. The tarp apron 34 is secured to bars 64 by fasteners 66. A rod 70 is mounted to the end of each bar 64 in any suitable manner such as by welding. As shown in FIG. 6, rod 70 extends generally parallel to the sides 18 of vehicle body 16. Thus, an L-shaped bracket is formed by each flat bar 64 and rod 70 connected to the appropriate bows 36.

The intermediate bows 36 which do not have the lock rods 70 would preferably still have short downward bars 64 to which the tarp apron 34 would be attached. This assures holding the tarp against the sides 18 of the vehicle throughout the length of the tarp.

As illustrated, the catch members 38, 40, 42 are mounted longitudinally spaced from each other and also in a staggered condition in the vertical direction. Where, for example, three such catch members are used, catch member 42 might be located about 2½ inches below open top 14. Catch member 40 might be located about 4½ inches below open top 14. Catch member 38 might be located 6½ inches below open top 14 The rods 70 on each respective lock member would be located the same distances corresponding to their catch members. Thus, the rod 70 for lock member 48 would be located about 2½ inches below the end of bow 36. The rod 70 for lock member 46 would be located about 4½ inches below the end of its bow 36. The rod 70 for lock member 44 would be located about 6½ inches below its bow 36. By having the lock members and catch members in a vertically staggered arrangement it is possible to move tarpaulin 12 in a covering direction so that each lock member is automatically disposed under its respective catch member without any interference from other catch members. Thus, for example, the lead lock member 48 would move above and past catch members 38 and 40 until its vertical bar 64 abuts against rod 50 with the rod 70 disposed under rod 50. At the same time the same locking action would take place with respect to lock member 46 and its catch member 40 and with respect to lock member 44 and its catch member 38. Disc 60 acts as a keeper to maintain rod 70 locked in place.

To assure maintaining tarpaulin 12 in place a fastener 66 is provided to secure the apron extension 34 with each bar 64.

FIGS. 4-5 illustrate a further feature of this invention wherein auxiliary cables 72,74 are provided to support tarpaulin 12 and function to hold down the tarpaulin. As illustrated cables 72, 74 are mounted in the spaces between the bows 36 and the tarpaulin 12 where the bows 36 are horizontal. Cable 72,74 extends the length of truck body 16 at the peripheral sides of open top 14. As the tarpaulin is moved in its covering or uncovering direction the tarpaulin is supported by cables 72,74 since the tarpaulin rests against and in contact with the cables 72,74. Additionally, the bows 36 are urged downwardly into edge contact with the rim of the open top 14 by the cables pressing against bows 36.

To further assure that tarpaulin 12 is leak proof, the tarpaulin system 10 may include a rear cap at the rear end 22 of vehicle body 16. As shown in FIG. 7 a flap 78 is secured by any suitable fastener 80 to the rear end 22 of vehicle body 16 so as to extend at least partially down the vehicle body. A V-shaped bracket 82 is mounted to the vehicle body at its top portion with downwardly extending plates. Bracket 82 extends the complete width of vehicle body 16 and includes a pair of U-shaped clips 84,86. Flap 78 terminates in a circular cross-section end 88 which is snapped into clip 84. When the tarpaulin is moved to its rearward or closed position, the end bow 36 rides over clip 86 and rests on the top of bracket 82. As illustrated the end 90 of tarpaulin 12 thus extends over bracket 82. The overlapping arrangement of tarpaulin 12 with respect to bracket 82 and of flap 78 with respect to bracket 82 creates a baffle effect to minimize the possibility of leakage at the rear end 22 of the vehicle body 16.

What is claimed is:

1. In a tarpaulin cover system for selectively covering and uncovering a vehicle body having side walls and having an open top and having a front end adjacent the cab of the vehicle and having a rear end remote from said front end, a tarpaulin of a width to extend across said body in the width direction and of a length to extend from said front end to said rear end to cover said vehicle body, said tarpaulin being anchored to said front end, and winding means for selectively moving an end of said tarpaulin toward said rear end to extend said tarpaulin over said body and for selectively moving said tarpaulin back toward said front end to expose said body, the improvement being in that said tarpaulin has a downwardly extending section which extends at least partially down a respective one of said sides of said body, a plurality of catch members secured to each of said sides at spaced locations longitudinally of said sides, each of said downwardly extending sections having a plurality of lock members corresponding to said plurality of catch members, and each of said lock members being disposed for being automatically engaged by a respective one of said catch members during the covering motion of said tarpaulin and being automatically disengaged from its said catch member during the uncovering motion of said tarpaulin.

2. The system of claim 1 wherein each of said catch members includes a post, and each of said lock members being of L-shape with a horizontal arm fitting under its respective post.

3. The system of claim 2 wherein a plurality of bows are mounted to said tarpaulin at spaced locations of said tarpaulin, and each of said lock members being secured to an end of a respective one of said bows whereby at least some of said bows have said lock members secured thereto.

4. The system of claim 3 wherein said catch members are located in a vertically staggered manner and said lock members being correspondingly located in a vertically staggered manner whereby each of said catch members is disposed in the path of motion of only its corresponding lock member.

5. The system of claim 4 including a keeper mounted to the end of each post to maintain said horizontal arm of its respective lock member mounted in engagement with its catch member.

6. The system of claim 5 wherein each of said posts is fixedly mounted to a side of the vehicle, and said keeper being a disc mounted to the free end of each post.

7. The system of claim 6 wherein each of said catch members includes a sleeve around said post, fastening members for securing said post to its respective side of said truck, said post terminating in an enlarged head at its free end, and said disc being secured between said sleeve and said enlarged head.

8. The system of claim 7 wherein each of said lock members is attached to a downwardly extending rigid bar connected to an end of its respective bow, and said tarpaulin being secured to said bar.

9. The system of claim 8 wherein each of said bows has said bar attached to each end of said bow with said tarpaulin secured to said bar, and said lock members being secured to bows which are not adjacent to each other with intermediate bows having no locking members.

10. The system of claim 9 wherein each of said bows is arched over the main portion of its length with the end portions of said bow being horizontal.

11. The system of claim 6 including support cables disposed longitudinally over said open top of said vehicle body adjacent said sides from said front end to said rear end, and said support cables being located between said tarpaulin and said bows to guide and support said tarpaulin and to function as said hold down means for said bows.

12. The system of claim 11 wherein said support cables comprise two cables along each of said two sides of said body.

13. The system of claim 12 wherein each of said bows is arched over the main portion of its length with the end portions of said bow being horizontal, and said cables being over said horizontal end portions of said bows.

14. The system of claim 12 including a rear cap at said rear end to prevent leakage into said vehicle body.

15. The system of claim 14 wherein said rear cap includes a generally U-shaped bracket located across the width of said vehicle body at said rear end, a flap extending vertically along said rear end along the entire width thereof and extending over said bracket at the rear end of said bracket, and said tarpaulin and its last bow extending over said bracket at the rear end of said vehicle body when said tarpaulin is in its covering condition.

16. The system of claim 4 including support cables disposed longitudinally over said open top of said vehicle body adjacent said sides from said front end to said rear end, and said support cables being located between said tarpaulin and said bows to guide and support said tarpaulin and to function as said hold down means for said bows.

17. The system of claim 4 including a rear cap at said rear end to prevent leakage into said vehicle body.

18. The system of claim including support cables disposed longitudinally over said open top of said vehicle body adjacent said sides from said front end to said rear end, and said support cables being located between said tarpaulin and said bows to guide and support said tarpaulin and to function as said hold down means for said bows.

19. The system of claim 1 including a rear cap at said rear end to prevent leakage into said vehicle body.

20. The system of claim 19 wherein said rear cap includes a generally U-shaped bracket located across the width of said vehicle body at said rear end, a flap extending vertically along said rear end along the entire width thereof and extending over said bracket at the rear end of said bracket, and said tarpaulin and its last bow extending over said bracket at the rear end of said vehicle body when said tarpaulin is in its covering condition.

* * * * *